May 21, 1929.  J. H. ALFES  1,713,861
TORQUE TUBE
Filed Sept. 16, 1927

Inventor
John H. Alfes

By Blackmore, Spencer & Hulit
Attorneys

Patented May 21, 1929.

1,713,861

UNITED STATES PATENT OFFICE.

JOHN H. ALFES, OF LANSING, MICHIGAN, ASSIGNOR TO GENERAL MOTORS CORPORATION, OF DETROIT, MICHIGAN, A CORPORATION OF DELAWARE.

TORQUE TUBE.

Application filed September 16, 1927. Serial No. 219,970.

This invention relates to motor vehicles, and more particularly to a device for cushioning torque tube vibrations.

The type of torque tube to which the invention is especially adapted houses the propeller or drive shaft, and is securely fastened to the differential housing on the rear axle at one end, and pivotally connected with the transmission casing at its front end.

One of the primary objects of the invention is to provide for the absorption of metallic sounds created by the rear axle and associated parts, and taken up by the torque tube.

A further object of the invention is to provide a cushion against sudden shocks transmitted from the rear axle to the transmission thru the torque tube.

Figure 1:
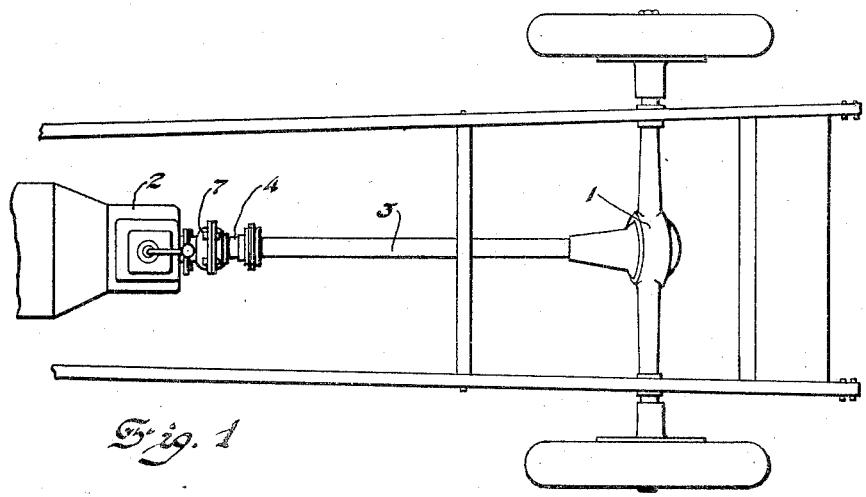
Figure 2:
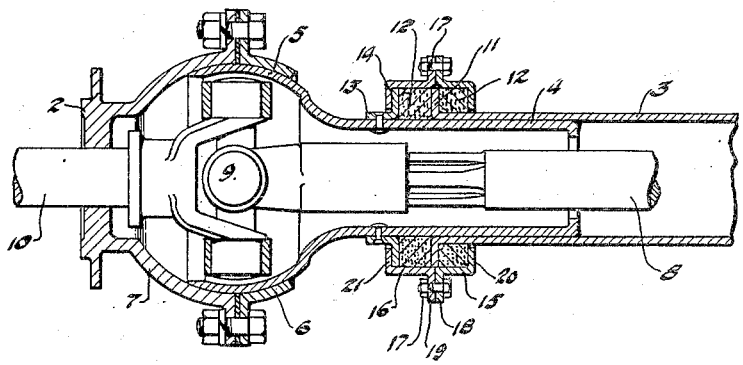

Other objects and advantages will be apparent from the following specification, having reference to the accompanying drawing, in which:

Fig. 1 is a top plan view of the rear portion of a motor vehicle chassis illustrating the application of the invention; and Fig. 2 is an enlarged sectional view of the front end of the torque tube, showing in detail the relation of the parts.

Referring more particularly to the drawing, illustrating the preferred embodiment of the invention, the reference character 1 indicates a housing for the differential gearing between the propeller shaft and the rear axle shafts, and the numeral 2 refers to the transmission housing. The torque tube extending between the floating differential housing and the fixed transmission casing, comprises two tubular sections 3 and 4, the rear end of the section 3 being securely fastened to the differential housing, while the front end of the section 4 has a ball head 5 formed thereon, which is held by the collar 6 within the ball socket 7 carried by the transmission casing 2 for universal pivotal movement. The adjacent ends of the respective sections 3 and 4, are concentrically arranged one within the other, in overlapped or telescopic relation, so as to afford a sliding fit to accommodate up and down movement of the rear axle with respect to the chassis. A similar to and fro sliding action is provided between the propeller or drive shaft 8 and the universal joint 9 connecting the drive shaft with the transmission shaft 10, the end of the drive shaft being splined in the hub of one of the yokes of the universal joint.

In order to cushion vibrations occurring in the tube 3, it is here proposed to form an annular flange 11 extending laterally from the end of the tube, on either side of which there is provided a ring or band 12—12 of soft rubber or other elastic cushioning material, held in place by means of a collar 13 riveted to the section 4, having an out-turned flange 14, together with a pair of rings 15—16 of Z-shape in cross section, forming a protective enclosure for the cushioning material. Fastening bolts 17, passing thru the out-turned flanges 18—19 of the rings 15—16 secure the rings together, and the inturned flange 20 of the ring 15 forms an abutment for the rearmost cushioning band 12, while the inturned flange 21 of the ring 16 seats against the flange 14 of the collar 13, which last mentioned flange also forms an abutment for the front cushioning band 12.

It is to be understood that the rubber bands 12—12 may be held in place by means other than that just described, the particular form shown having been designed with a view of economy and convenience in manufacture and assembly.

From the above description it will be apparent that the elastic rings positioned between the flanges 14 and 20 associated with the section 4 and extending in a lateral direction with respect to the torque tube, and the lateral flange 11 on the section 4, serve to dampen and absorb noises and sudden impulses both to and fro, and obviate their transmission beyond the torque tube.

While the device has been described more or less specifically it is to be understood that the invention is not limited to the exact details involved, but that such modifications may be made as come within the scope of the appended claims.

I claim:

1. A torque tube including a pair of concentric tubular members having portions thereof arranged in telescopic relation and cushioning means interposed between portions of said members to eliminate transmission of relative vibrations from one member to the other.

2. A torque tube including a pair of concentric tubular members having portions thereof arranged in telescopic relation, and non-metallic elastic cushioning material interposed between said telescopic portions to cushion relative movement between said members.

3. A torque tube including a pair of concentric tubular members slideable one on the other, members carried by the respective tubular members and projecting laterally to the longitudinal extent of said torque tube and elastic cushioning material interposed between said laterally projecting members, and deformable therebetween to cushion torque tube vibrations.

4. A torque tube including a pair of concentric tubular members having portions thereof arranged one within the other in telescopic relation for relative sliding movement, and non-metallic elastic cushioning material carried by one of the members in engagement with the other member.

5. A torque tube including a pair of concentric tubular members having portions thereof arranged one within the other in overlapping relation for relative sliding movement, lateral flanges carried by the respective members in spaced relation, and elastic cushioning material interposed therebetween.

6. A torque tube including a pair of concentric tubular members having portions thereof arranged one within the other in overlapping relation for relative sliding movement, a lateral flange at the end of the outer member, elastic deformable material on either side thereof, and a retainer element for said elastic material carried by the inner member.

7. A torque tube including a pair of concentric tubular members having a sliding fit one on the other, the outer tubular member being provided with an out-turned flange at one end thereof, a pair of laterally extending portions carried by the other of said members, one on either side of said flange, and elastic cushioning material interposed between the lateral portions and on opposite sides of said flange.

In testimony whereof I affix my signature.

JOHN H. ALFES.